US011431958B2

(12) United States Patent
Lindgren et al.

(10) Patent No.: US 11,431,958 B2
(45) Date of Patent: Aug. 30, 2022

(54) VISION SYSTEM AND METHOD FOR A MOTOR VEHICLE

(71) Applicant: ARRIVER SOFTWARE AB, Linkoping (SE)

(72) Inventors: Leif Lindgren, Linköping (SE); Fredrik Medley, Linköping (SE); Per Knutsson, Linköping (SE)

(73) Assignee: VEONEER SWEDEN AB, Vargarda (SE)

( * ) Notice: Subject to any disclaimer, the term of this patent is extended or adjusted under 35 U.S.C. 154(b) by 295 days.

(21) Appl. No.: 16/305,654

(22) PCT Filed: May 31, 2017

(86) PCT No.: PCT/EP2017/063229
§ 371 (c)(1),
(2) Date: Nov. 29, 2018

(87) PCT Pub. No.: WO2017/207669
PCT Pub. Date: Dec. 7, 2017

(65) Prior Publication Data
US 2020/0322588 A1    Oct. 8, 2020

(51) Int. Cl.
*H04N 13/246* (2018.01)
*B60R 11/04* (2006.01)
(Continued)

(52) U.S. Cl.
CPC ........... *H04N 13/246* (2018.05); *B60R 11/04* (2013.01); *G06K 9/00798* (2013.01); *G06K 9/00805* (2013.01); *H04N 2013/0081* (2013.01)

(58) Field of Classification Search
CPC .......... H04N 13/246; H04N 2013/0081; B60R 11/04; G06K 9/00798; G06K 9/00805;
(Continued)

(56) References Cited

U.S. PATENT DOCUMENTS

| 8,120,644 B2* | 2/2012 | Chen ......................... G06T 7/97 |
| | | 348/46 |
| 2008/0089557 A1* | 4/2008 | Iwaki ..................... G01S 11/12 |
| | | 382/106 |

(Continued)

FOREIGN PATENT DOCUMENTS

| DE | 10 2012 009 577 A1 | 11/2012 |
| DE | 10 2013 224 502 A1 | 6/2014 |

OTHER PUBLICATIONS

Badino, Hernan, et al. "Visual Odometry by Multi-frame Feature Integration", International Workshop on Computer Vision for Autonomous Driving (CVAD 13) in conjunction with ICCV 2013, Sydney, Australia, 8 pgs.

(Continued)

*Primary Examiner* — Susan E. Hodges
(74) *Attorney, Agent, or Firm* — Dickinson Wright PLLC

(57) ABSTRACT

A vision system (10) for a motor vehicle with a stereo imaging apparatus (11) with imaging devices (12) adapted to capture images from a surrounding of the motor vehicle, and a processing device (14) adapted to process images captured by the imaging devices (12) and to detect objects, and track detected objects over several time frames, in the captured images. The processing device (14) is adapted to obtain an estimated value for the intrinsic yaw error of the imaging devices (12) by solving a set of equations, belonging to one particular detected object (30), using a non-linear equation solver method, where each equation corresponds to one time frame and relates a frame time, a disparity value of the particular detected object, an intrinsic yaw error and a kinematic variable of the vehicle.

16 Claims, 1 Drawing Sheet

(51) Int. Cl.
　　　*G06T 7/80*　　　　(2017.01)
　　　*G06K 9/00*　　　　(2022.01)
　　　*H04N 13/00*　　　(2018.01)
(58) Field of Classification Search
　　　CPC ............. G06T 7/85; G06T 2207/10021; G06T 2207/30244; G06T 2207/30261
　　　USPC .......................................................... 348/47
　　　See application file for complete search history.

(56)　　　　　　　　References Cited

U.S. PATENT DOCUMENTS

2008/0144924 A1　　6/2008　Hoffmann
2012/0224069 A1　　9/2012　Aoki
2014/0168377 A1　　6/2014　Cluff et al.
2016/0335755 A1*　11/2016　Hilsebecher ....... H04N 5/23296

OTHER PUBLICATIONS

International Search Report and Written Opinion of PCT/EP2017/063229, dated Jul. 12, 2017.

* cited by examiner

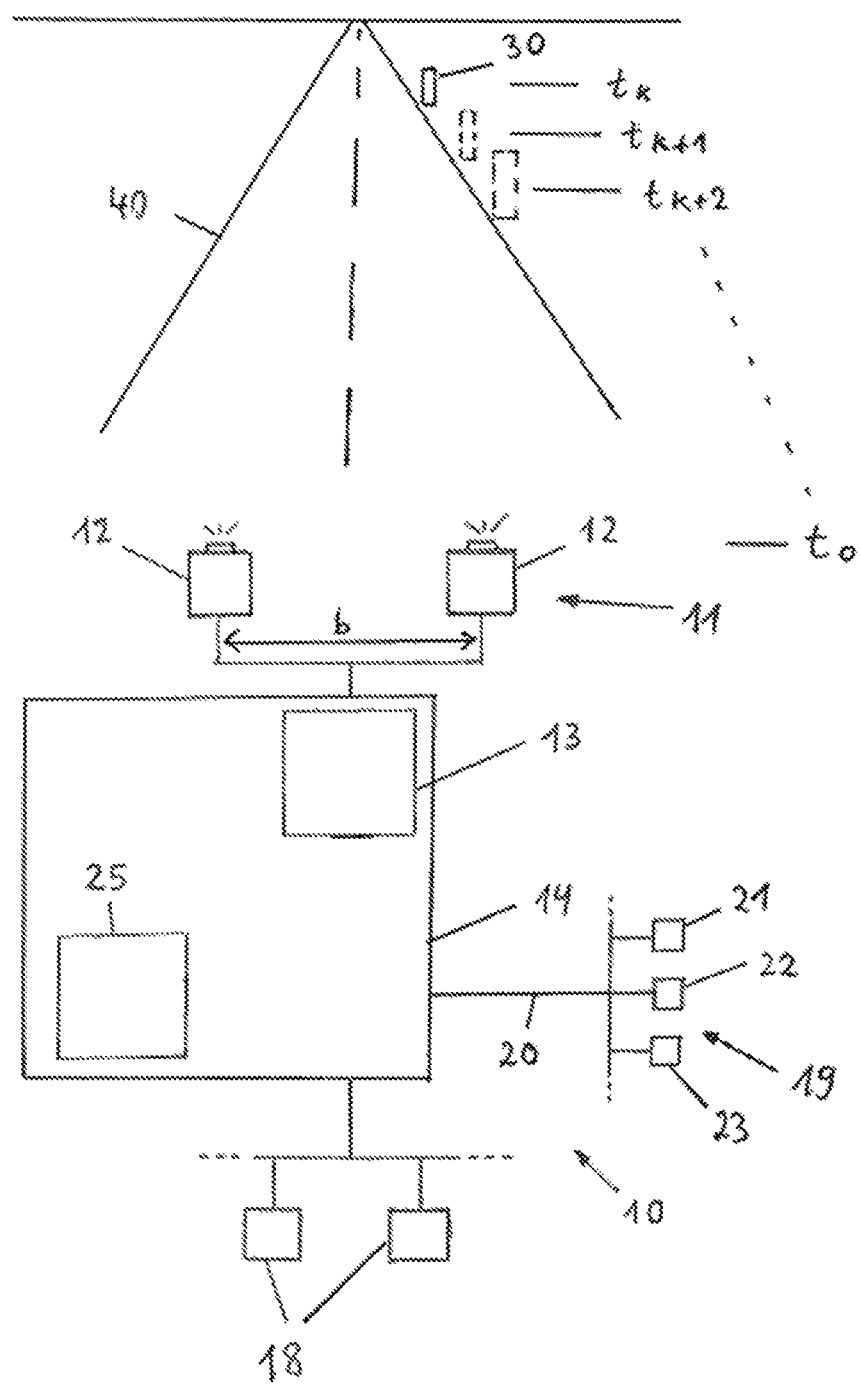

VISION SYSTEM AND METHOD FOR A MOTOR VEHICLE

CROSS-REFERENCE TO RELATED APPLICATIONS

This application is a 35 U.S.C. § 371 national phase of PCT International Application No. PCT/EP2017/063229, filed May 31, 2017, which claims the benefit of priority under 35 U.S.C. § 119 to European Patent Application No. 16172442.2, filed Jun. 1, 2016, the contents of which are incorporated herein by reference in their entirety.

FIELD OF THE INVENTION

The invention relates to a vision system for a motor vehicle, including a stereo imaging apparatus with imaging devices adapted to capture images from a surrounding of the motor vehicle, and a processing device adapted to process images captured by the imaging devices and to detect objects in the images corresponding to real-world objects in the surrounding of the motor vehicle, and to track detected objects over several time frames in the captured images. The invention also relates to a corresponding vision method.

BACKGROUND

The yaw angle, also known as squint angle, between the left camera and the right camera in a stereo camera system, must be determined with great accuracy, because an error in this angle results in large distance estimation errors in the stereo calculations. The distance error grows with the square of the distance. For an automotive stereo camera the squint angle will not be constant over the vehicle life time due to thermal changes and the long life time of automotive systems. Therefore, an online solution for estimating a squint angle error is needed.

It is known to estimate the squint angle error using radar or lidar distance information as a reference value, which however requires a radar or lidar reference system.

DE 10 2012 009 577 A1 describes a method of calibrating the squint angle between two stereo cameras in a motor vehicle from a comparison of a reference driven distance determined from odometric data to a stereoscopic driven distance determined by image processing. However, the external odometric data needed to calculate the reference driven distance constitute an additional systematic source of uncertainty for the determination of the squint angle error.

DE 10 2013 224 502 A1 discloses a method of calibrating a stereo camera of a vehicle. The method involves separately determining the optical flow of the images from both cameras. From the optical flow and the estimated ego motion of the vehicle, corresponding 3D environment data are calculated. From a comparison of the 3D environment data of both cameras, a calibration error is determined.

Both of the above mentioned methods require exact knowledge of the movement of the ego vehicle given by some other sensor.

US 2014/0168377 A1 discloses a method for aligning a stereo camera of a vehicle mounted object detection system, wherein an image from each camera at two different times is used to determine an observed displacement of a stationary object, like a traffic sign, relative to the vehicle. A predicted displacement of the object relative to the vehicle is also determined using, for example, a difference of size of the object in images taken at two different times. Determining a triangulation correction based on a difference of the observed displacement and the predicted displacement is used to correct for misalignment of the cameras.

The object of the present invention is to provide a vision system and a method of controlling a vision system which allow for an accurate determination of a yaw angle error between the stereo cameras during operation of a motor vehicle.

SUMMARY

The invention solves the above-described object with embodiments of the invention described herein. According to embodiments of the invention, a set of equations is solved by using a non-linear equation solver method in order to obtain an estimated value for the intrinsic yaw error. Each equation corresponds to one time frame and relates a time of the time frame, a calculated disparity value of the particular detected object, an intrinsic yaw error, and a kinematic variable of the ego vehicle, by using a non-linear equation solver method in order to obtain an estimated value for the intrinsic yaw error. It has been found out that in this manner, the yaw angle error between the stereo cameras can be accurately determined during movement of the motor vehicle, allowing for a corresponding yaw angle calibration of the stereo cameras.

The estimated value for the intrinsic yaw error can advantageously be used for calibrating the yaw angle between the imaging devices during driving.

Preferably, all equations in the set have the same form. In particular, all equations in the set are preferably obtained by equalizing the current distance to the particular detected object as obtained from vehicle kinematics, to the current distance as obtained from the disparity value. Herein, the current distance as obtained from the disparity value may be expressed as $x=f \cdot b/(d+\varepsilon)$, where f is the focal length of the imaging devices in the baseline direction, b is the baseline, i.e. the distance between the imaging devices, d is the current disparity value, and $\varepsilon$ is the intrinsic yaw error. In many cases, the baseline direction is horizontal. However, the baseline direction may also have a significant vertical component, for example if the stereo imaging devices are located far away from each other, like in the front bumper and behind the wind screen of the vehicle. In such cases, the baseline and focal length direction are measured in the non-horizontal direction between the imaging devices.

In the ideal case, where $\varepsilon=0$, the above equation gives the well-known relation between the distance x and the disparity d of a detected object. In the real case, where $\varepsilon \neq 0$, the above equation is used with the additional advantageous feature of expressing the yaw error $\varepsilon$ as a simple shift to the disparity value d. In other words, the calculated disparity d and the yaw error $\varepsilon$ are related to each other by addition or subtraction in the equation. In other words, the ideal disparity D is expressed by adding (or subtracting) the yaw error $\varepsilon$ to or from the calculated disparity d. This inventive approach is accurate because of the small angle approximation: the yaw angle $\varepsilon$ is very small, such that $\sin \varepsilon \approx \varepsilon$. An example of an unacceptable error $\varepsilon$ is 0.05 degrees.

In order to improve the accuracy in the yaw error estimation, the number of equations used in the set of equations is preferably larger than the unknown variables, preferably by a factor of at least 1.5, more preferably by a factor of at least 2, even more preferably by a factor of at least 3. Preferably the number of equations used in the set is at least three, preferably at least five, more preferably at least ten.

Generally speaking, the higher the number of equations used, the higher the precision of the unknown variables determined.

Preferably, the set of equations is based on the assumption of an essentially constant ego vehicle speed v, simplifying the equations for the yaw error calculation and thus reducing the computational effort. In particular, the above mentioned current distance x to the particular detected object as obtained from vehicle kinematics can be simply expressed by the equation x=(t0−t)·v, where t0 is the (unknown) time when the particular detected object is at x=0, i.e. on the straight line connecting the imaging devices, t is the frame time of the current time frame, such that t0−t is the time to collision TTC, and the kinematic variable v is the ego vehicle speed, i.e. the longitudinal speed of the ego vehicle, generally relative to the particular detected object, or in case of a stationary detected object, is the absolute ego vehicle speed (relative to ground).

Summarizing the above, a practically preferred general form of equation to be used in the yaw error estimation is;

$$(t0-t) \cdot (d+\varepsilon) - f \cdot b/v = 0$$

Preferably, the vision system is adapted to determine whether a detected object is stationary or near-stationary, and to discard a detected object which is not fulfilling this condition, i.e., which is moving. This can be done by determining the speed of a detected object and discarding the object in case it has non-zero speed, or a speed exceeding a predetermined threshold. The speed of a detected object is preferably estimated by a tracker in the processing device adapted to track detected objects or object candidates over time. Other ways of determining the speed of a detected object are possible. Also, other ways of determining whether a detected object is stationary or near-stationary are possible, for example by using a classifier in the image processing of detected objects, and only taking account of classified objects which are known to be stationary, like poles, traffic signs, lamp posts, trees, animal will crossings, dashed lane markings etc.

In the case of a stationary detected object, the above mentioned condition of an essentially constant ego vehicle speed relative to the detected object reduces to an essentially constant absolute ego vehicle speed (relative to ground). Consequently, the vision system is preferably adapted to determine whether the ego vehicle speed is essentially constant, and to discard in the yaw error estimation image frames not fulfilling this condition. The condition of essentially constant ego vehicle speed can be easily evaluated for example by monitoring the ego vehicle speed available on a vehicle data bus, namely the ego vehicle speed measured by an angular velocity sensor arranged in a measuring relationship to a rotating part in the powertrain of the ego vehicle, like the crankshaft, which velocity is proportional to the wheel speed and is displayed by the cockpit speedometer. Other ways of evaluating the condition of an essentially constant ego vehicle speed are possible, for example by monitoring the more exact speed value provided by a satellite navigation system (GPS) receiver of the motor vehicle; or by evaluating the signal from a longitudinal acceleration sensor, which should be zero or near-zero.

As mentioned above, the kinematic variable may in particular be the longitudinal vehicle speed. However, the kinematic variable may also be for example the integrated longitudinal vehicle speed, or the longitudinal acceleration of the ego vehicle. In case of longitudinal vehicle speed, there are different ways of handling the speed variable in the set of equations. In a preferred embodiment, the speed variable v is regarded as known, i.e. the ego vehicle speed v provided by a speed sensor and/or a satellite navigation system receiver of the motor vehicle is inserted into the equations. This has the advantage that by reducing the number of unknown variables by one, the accuracy in the determination of the other unknown variables, including the yaw error, can be improved. On the other hand, the speed variable v may be regarded as un-known, and the ego vehicle speed v can be derived by solving the set of equations by using the non-linear equation solver method, just in the same manner as deriving other unknowns such as the intrinsic yaw error. In this application, the invention delivers an ego vehicle speed value independent of the speed value related to the wheel speed and displayed by the cockpit speedometer, which may be used for calibrating the ego vehicle speed.

Preferably, the set of equations is based on the assumption of the ego vehicle essentially moves straight. This allows for simplification of the equations, and for using the vehicle speed as the longitudinal velocity in the equations, since the lateral speed component is zero or near zero. In this regard, the vision system preferably is adapted to monitor a condition of an essentially straight moving ego vehicle, and to discard image frames not fulfilling the condition. Herein, the condition of an essentially straight moving ego vehicle can be monitored on the basis of a signal from a yaw rate sensor and/or a steering wheel angle sensor of the motor vehicle.

BRIEF DESCRIPTION OF THE DRAWING

In the following the invention shall be illustrated on the basis of preferred embodiments with reference to the accompanying drawings, wherein:

FIG. 1 shows a vision system for a motor vehicle according to an embodiment of the invention.

DETAILED DESCRIPTION

The vision system 10 is mounted in a motor vehicle and includes an imaging apparatus 11 for acquiring images of a region surrounding the motor vehicle, for example a region in front of the motor vehicle. The imaging apparatus 11 includes a plurality of optical imaging devices 12, in particular cameras, forming a stereo imaging apparatus 11 and operating in the visible and/or infrared wavelength range, where infrared covers near IR with wavelengths below 5 microns and/or far IR with wavelengths beyond 5 microns.

The imaging apparatus 11 is coupled to a data processing device 14 adapted to process the image data received from the imaging apparatus 11. The data processing device 14 may include a pre-processing section 13 adapted to control the capture of images by the imaging apparatus 11, receive the signal containing the image information from the imaging apparatus 11, rectify or warp pairs of left/right images into alignment and/or create disparity or depth images, which per se is known in the art. The image pre-processing section 13 may be realized by a dedicated hardware circuit, for example a Field Programmable Gate Array (FPGA) or an Application Specific Integrated Circuit (ASIC). Alternatively the pre-processing section 13, or part of its functions, can be realized by software in a microprocessor or in a System-On-Chip (SoC) device including, for example, FPGA, DSP, ARM and/or microprocessor functionality.

Further image and data processing carried out in the processing device 14 by corresponding software advantageously includes identifying and preferably also classifying possible objects in front of the motor vehicle, such as pedestrians, other vehicles, bicyclists and/or large animals, by a classifier, tracking over time the position of object candidates identified in the captured images by a tracker, and activating or controlling at least one driver assistance device 18 depending on an estimation performed with respect to a tracked object, for example an estimated collision probability. The driver assistance device 18 may in particular include a display device to display information relating to a detected object. However, the invention is not limited to a display device. The driver assistance device 18 may in addition or alternatively include a warning device adapted to provide a collision warning to the driver by suitable optical, acoustical and/or haptic warning signals; one or more restraint systems such as occupant airbags or safety belt tensioners, pedestrian airbags, hood lifters and the like; and/or dynamic vehicle control systems such as brake or steering control devices.

The data processing device 14 is preferably a digital device which is programmed or programmable and preferably includes a microprocessor, micro-controller, digital signal processor (DSP) or a System-On-Chip (SoC) device. The data processing device 14, pre-processing section 13 and the memory device 25 are preferably realised in an on-board electronic control unit (ECU) and may be connected to the imaging apparatus 11 via a separate cable or a vehicle data bus. In another embodiment the ECU and one or more of the imaging devices 12 can be integrated into a single unit, where a one box solution including the ECU and all imaging devices 12 can be preferred. All steps from imaging, image pre-processing, image processing to possible activation or control of driver assistance device 18 are performed automatically and continuously during driving in real time.

The processing device 14 has access to information obtained from other vehicle sensors 19, like velocity sensor 21, yaw rate sensor 22, steering wheel sensor 23 etc. in the motor vehicle via a digital data bus 20, for example a CAN bus. The velocity sensor 21 may be an angular velocity sensor arranged in a measuring relationship to a rotating part in the powertrain of the ego vehicle, like the crankshaft or driveshaft, between the transmission and the wheels. The yaw rate sensor 22 may for example be an acceleration sensor measuring the lateral acceleration of the vehicle.

In the following, the invention is described by way of example as shown in FIG. 1, namely through detecting and tracking a pole 30 in the images captured by the imaging system 11. The pole 30 is detected by an object detection section and tracked by a tracker in the image processing device 14. It may be assumed that the pole 30 is detected in time frame $t_k$ and found in subsequent in the images corresponding to subsequent time frames $t_{k+1}, t_{k+2}, \ldots$. For each frame, the corresponding disparity $d_k, d_{k+1}, d_{k+2}, \ldots$ is calculated in the processing means 14 in the usual manner as the baseline distance in pixels between the detected object, here the pole 30, in the left and right stereo images.

The vision system permanently monitors the ego vehicle speed provided by the vehicle speed sensor 21. It shall be assumed that the vehicle moves with constant velocity on the road 40. Furthermore, the processing device 14 determines that the vehicle is moving straight on the road, based on the signal from the yaw rate sensor 22, or alternatively from the steering wheel sensor 23. Based on information from the tracker in the image processing section of the data processing device, the pole 30 is correctly estimated to be stationary. Since all conditions are met, therefore, the object 30 in the time frames $t_k, t_{k+1}, t_{k+2}, \ldots$ is regarded admissible by the processing device 14. The processing device 14 then sets up the following set of equations for the pole 30:

$$(t0-t_k)\cdot(d_k+\varepsilon)-f\cdot b/v=0$$

$$(t0-t_{k+1})\cdot(d_{k+1}+\varepsilon)-f\cdot b/v=0$$

$$(t0-t_{k+2})\cdot(d_{k+2}+\varepsilon)-f\cdot b/v=0$$

etc., where it is understood that at least three equations is sufficient to estimate a value of the yaw angle error, and preferably more than three equations, for example at least ten equations, are used in order to achieve a sufficient accuracy in the yaw error estimation. It can be seen that all equations have the same form, and differ in the value of the frame time t and the disparity d, only.

In the above equations, the values for $t_k, t_{k+1}, t_{k+2}, \ldots$ and the corresponding disparity values $d_k, d_{k+1}, d_{k+2}, \ldots$ for the pole 30 are inserted, together with the known values for f, b and v. This gives a set of equations with two unknowns, namely the collision time t0 (where the pole is on a line connecting the camera devices 12) and the yaw error $\varepsilon$. The set of equations forms a non-linear least squares problem and may be easily solved for t0 and $\varepsilon$ using a non-linear equation solver method like the Gauss-Newton algorithm.

The yaw angle error $\varepsilon$ calculated from a single other object, here the pole 30, could be further filtered over time to improve the accuracy. Also a suited average of $\varepsilon$ values over a plurality of other objects could be formed.

The resulting value of $\varepsilon$ has been found to be a sufficiently accurate measure of the yaw angle error, which can be advantageously used in a yaw angle error calibration during driving of the motor vehicle.

Constant ego vehicle speed is not a strict requirement for realizing the invention. For example, an alternative to the equation $x=(t0-t)\cdot v$ used above would be the equation $$x_i = \alpha \cdot \int_{ti}^{t0} v(t)dt$$

letting the ego vehicle speed v(t) be variable, where i is a frame index and $\alpha$ is a multiplicative error of the vehicle speed. The error of the vehicle speed can be regarded multiplicative as the speed can be expressed as wheel-radius=$\alpha$·wheel-radius(set) and v=$\alpha$·v(wheel-speed). It may also be possible to set $\alpha=1$ in the above equation.

As mentioned above, the invention allows to estimate f·b/v. Therefore, if f and b are known, v and $\alpha$ can be estimated. Also, if v, or an integrated v, i.e. $\int_{ti}^{t0} v(t)dt$, is known from other sources, like a satellite navigation receiver, f could be regarded unknown and thereby estimated online. On the other hand, if f is considered known, baseline b, which slightly varies over temperature, can be estimated.

While the above description constitutes the preferred embodiment of the present invention, it will be appreciated that the invention is susceptible to modification, variation and change without departing from the proper scope and fair meaning of the accompanying claims.

The invention claimed is:

1. A vision system for a motor vehicle, comprising; a stereo imaging apparatus with one or more imaging devices configured to capture one or more images from a surrounding of the motor vehicle, and a processing device configured to process the images captured by the imaging devices and to detect objects, and track the objects over several time frames, in the captured images, the processing device is configured to obtain an estimated value for an intrinsic yaw error of the imaging devices by solving a set of equations including at least three equations, each belonging to one particular detected object, using a non-linear equation solver method, where each equation corresponds to one time frame and relates a frame time, a disparity value of the one particular detected object, an intrinsic yaw error and a kinematic variable of the vehicle, and where all equations of the set of equations differs in a value of the frame time.

2. A vision system as claimed in claim 1 further comprising, in that the kinematic variable of the vehicle is the vehicle speed.

3. A vision system as claimed in claim 1 further comprising, in that the set of equations is based on the assumption of an essentially constant speed of the vehicle.

4. A vision system as claimed in claim 1 further comprising, in that the vision system is configured to determine a condition whether the speed of the vehicle is essentially constant, and to discard in the yaw error estimation image frames not fulfilling the condition.

5. A vision system as claimed in claim 1 further comprising, in that the vision system is configured to determine whether the object is stationary or near-stationary, and to discard in the yaw error estimation for the object not being stationary or near-stationary.

6. A vision system as claimed in claim 5 further comprising, in that the vision system is configured to determine a speed of a detected object, using a tracker in the processing device configured to track the objects over time.

7. A vision system as claimed in claim 1 further comprising, in that the vision system inserts into the set of equations the known vehicle speed available on a data bus of the motor vehicle.

8. A vision system as claimed in claim 1 further comprising, that a vehicle speed is derived by solving the set of equations by using the non-linear equation solver method.

9. A vision system as claimed in claim 1 further comprising, in that the set of equations is based on the assumption of the vehicle essentially moves straight.

10. A vision system as claimed in claim 1 further comprising, in that the vision system is configured to determine whether the vehicle essentially moves straight, and to discard frames of the captured images not fulfilling this condition.

11. A vision system as claimed in claim 10 further comprising, in that whether the vehicle essentially moves straight is determined on the basis of a signal from a yaw rate sensor or a steering wheel angle sensor of the motor vehicle.

12. A vision system as claimed in claim 1 further comprising, in that the set of equations fulfills one or more of the following properties:
   all equations have the same form;
   all equations are obtained by equalizing a current distance to the particular detected object as obtained from vehicle kinematics, to the current distance as obtained from the disparity value; and
   the yaw error is expressed as a shift to the disparity value.

13. A vision system as claimed in claim 1 further comprising, in that the estimated value for the intrinsic yaw error is used for calibrating the yaw angle between a plurality of the one or more imaging devices.

14. A vision method for a motor vehicle, comprising the steps of capturing images from a surrounding of the motor vehicle using a stereo imaging apparatus with stereo imaging devices, processing images captured by the imaging devices of detecting objects, and tracking the detected objects over several time frames, in the captured images, obtaining an estimated value for an intrinsic yaw error of the imaging devices by solving a set of equations including at least three equations, each belonging to one particular detected object, using a non-linear equation solver method, where each equation corresponds to one time frame and relates a frame time, a disparity value of the one particular detected object, an intrinsic yaw error and a kinematic variable of the vehicle, and where all equations of the set of equations differs in a value of the frame time.

15. A vision method as claimed in claim 14, wherein the non-linear equation solver method includes the Gauss-Newton algorithm.

16. A vision system as claimed in claim 1, wherein the non-linear equation solver method includes the Gauss-Newton algorithm.

* * * * *